(12) United States Patent
Wang (10) Patent No.: US 8,613,046 B2
(45) Date of Patent: Dec. 17, 2013

(54) FAR-END CONTROL METHOD WITH SECURITY MECHANISM

(75) Inventor: Hsu-Cheng Wang, Shing Tien (TW)

(73) Assignee: Moxa Inc., Shing Tien, Taipei Hsien (TW)

( * ) Notice: Subject to any disclaimer, the term of this patent is extended or adjusted under 35 U.S.C. 154(b) by 884 days.

(21) Appl. No.: 12/345,625

(22) Filed: Dec. 29, 2008

(65) Prior Publication Data

US 2010/0169956 A1   Jul. 1, 2010

(51) Int. Cl.
*G06F 7/04* (2006.01)

(52) U.S. Cl.
USPC ............... 726/3; 726/1; 726/2; 726/4; 726/5; 726/6; 380/247; 380/248; 380/249; 380/250; 710/107; 710/108; 710/109; 710/110; 710/111; 710/112; 710/113; 710/114; 710/115; 713/155; 713/156; 713/157; 713/158; 713/159

(58) Field of Classification Search
USPC ........... 726/1–6; 380/247–250; 710/107–115; 713/155–159
See application file for complete search history.

(56) References Cited

U.S. PATENT DOCUMENTS

| 7,437,331 | B1* | 10/2008 | Rosenberger | .................. 705/77 |
| 7,929,979 | B2* | 4/2011 | Konno | ....................... 455/456.4 |
| 2002/0162008 | A1* | 10/2002 | Hill | ............................... 713/200 |
| 2005/0141563 | A1* | 6/2005 | McHale et al. | ............... 370/493 |
| 2008/0250478 | A1* | 10/2008 | Miller et al. | ...................... 726/5 |
| 2010/0074420 | A1* | 3/2010 | Bauchot et al. | ........... 379/88.02 |

\* cited by examiner

*Primary Examiner* — Edan Orgad
*Assistant Examiner* — Roderick Tolentino
(74) *Attorney, Agent, or Firm* — Bacon & Thomas, PLLC (57) ABSTRACT

The present invention relates to a far-end control method with a security mechanism including a host transmitting an identification code through the PSTN (Public switched telephone network) to the I/O control device of the far-end. The I/O control device has a CPU to receive the identification code and judge whether the identification code matches with the predetermined value stored therein; if the identification code matches with the predetermined value, the mobile internet connection between the host and the I/O control device is activated to enable the host to mutually transmit information or signals with a far-end control device from the I/O control device through the mobile internet, and the connection will be disabled after the information or signal transmission is completed. Thus not only the damage caused by line occupied from the hacker invasion or error signal transmission is reduced, but also the cost and power consumption without connecting the mobile internet between these two ends all the time is reduced.

11 Claims, 7 Drawing Sheets

FAR-END CONTROL METHOD WITH SECURITY MECHANISM

BACKGROUND OF THE INVENTION

1. Field of the Invention

The present invention relates to a far-end control method with a security mechanism including confirming matching of a identification code transmitted by a host through a PSTN (Public switched telephone network) with a predetermined value stored in an I/O control device to activate a connection of a mobile internet between these two ends, and thus to reduce damage caused by line occupied from a hacker invasion or error signal transmission, and also reduce the cost and power consumption without connecting the mobile internet between these two ends all the time.

2. Description of Related Art

The rapid advancement of information technology and continuously developing telecommunication technology have led to creation of wired telephone, pager and mobile phone of first, second and third generations. With the rapid development in technology, the telecommunication companies developed the telecommunication technology of 3G, 3.5G and 4G to broaden the appliance range in the future mobile phone communication. Accordingly, the content and the appliance of the mobile phone communication have expanded more to even connect with the mobile internet with upgraded digital transmission function. The upgraded band width of the mobile internet enables many industrial control equipment and electronic mechanics to execute the related operations of the far-end control with the mobile internet technology. Particularly for remote area or region with difficulty of arranging wiring, the company uses an internal computer to mutually transmit the information or data with the industrial control equipment of the remote area through the mobile internet. However, such industrial control equipment is not equipped with transmitting or receiving function of the mobile internet, and therefore, mutual communication with the computer is not direct and an I/O control device with the transmitting or receiving function of the mobile internet is required for serving a bridge for communication between the computer and the industrial control equipment. Thus, through the I/O control device and the industrial control equipment, the computer can reading data from the electric meter, company gate inhibition from the far-end water gate opening and closing, power supply control to the remote area and others. But such I/O control device does not have the mechanism to prevent the unauthorized invasion or monitoring; and the damage can be serious if hacker invades into the system to interrupt the communication or to make the fault signal transmission during the process of the mobile internet and the communication. For example, the far-end is unable to read the data of the electric meter if the band width of reading the number from the electric meter is fully occupied by the hacker; all the company's information, business secrets and properties will be facing the traumatic threat if the gate inhibition is invaded; if the water gate opening and closing system is invaded and the water level is over the predetermined level, the water gate may lose the normal function of opening for releasing the water or to discharge the flood when the water level hasn't reached the predetermined level, and such unexpected situation can cause mass of the damages.

Furthermore, the above-mentioned mobile internet technology uses the dynamic IP address, which is variable when reconnecting after disconnection, thus to have the advantage of being not easy to be locked up by a hacker. But because the computer cannot retrieve the new IP address of the I/O control device after the I/O control device disconnection and reconnection with the mobile internet of the base, the computer cannot automatically reconnect with the I/O control device. In such conventional structure, the solution for preventing the disconnection between the I/O control device with the mobile internet of the base is to transmit some meaningless package to the base by the I/O control device at a certain time in order to hold on to the present IP address. Somehow, even such transmission by a static IP address still has the risk of being locked up by a hacker to cause the above damages. Besides, the mobile internet usually charges according to the packet of the transmission. When the system is being hacked, the industrial control equipment will repeatedly send out packages through the I/O control device increasing the cost of the company. On the other hand, in this conventional structure, the I/O control device has to keep transmitting the package to the base for staying on the line, and the cost on the power consumption of the I/O control device is correspondingly high.

Therefore, the method for the companies to keep out the unauthorized invasion into the mobile internet usually is to apply a virtual intranet by the internet service provider (ISP), for example the Cingular, Verizon, Chunghwa Telecom, Taiwan Mobile, Far Eastone Telecommunications Company or others, to own an exclusive access point name (APN), thus the company can use the particular IP address in the exclusive APN to combine with the firewall for filtering at the IP address and the entrance to further process the network connection between the computer and the far-end industrial control equipment. Even though this method can effectively prevent the hacker invasion, but the application cost is too high; based on the fact that different areas have different density, so the company has to apply the exclusive APNs from different ISPs. The system of each ISP is independent and incompatible thus difficult for the company to integrate all the information transmission.

Therefore, how to overcome the above conventional defects is an important issue for the manufacturers in the field.

SUMMARY OF THE INVENTION

An object of the present invention is to provide a far-end control method with the security mechanism capable of overcoming the defects of the conventional method described above.

The present invention proposes means to reduce damage caused by a hacker invasion and verify an identification code transmitted from a host through the PSTN (Public switched telephone network) by a CPU of an I/O control device, for example, verifying whether an incoming telephone call number, text message contents, incoming text message number or inputted code matches with a predetermined value stored in the memory of the CPU. Next, after the verification, the mobile internet is connected between the I/O control device and the host, and the mobile internet connection is disconnected when the transmission is completed. Thus, the chance of being locked up by the hacker and further being invaded to prevent the information in the monitor system from being controlled or changed may be effectively reduced, and thereby reduce the property and labor loss, as well as the cost of the mobile internet connection between the I/O control device and the host and the power consumption of the I/O control device may be effective reduced.

According to another aspect of the present invention, when the host calls or transmits the message to the I/O control device, the I/O control device is capable of executing the verification without the call gets connected through. On the other hand, execution with the password verification enables disconnection of the line right after inputting the password. Thus, the company need not spend much on telecommunication for executing the security mechanism.

BRIEF DESCRIPTION OF THE DRAWING

For a more complete understanding of the present invention, reference will now be made to the following detailed description of preferred embodiments taken in conjunction with the following accompanying drawings.

DETAIL DESCRIPTION OF THE INVENTION

Figure 1:
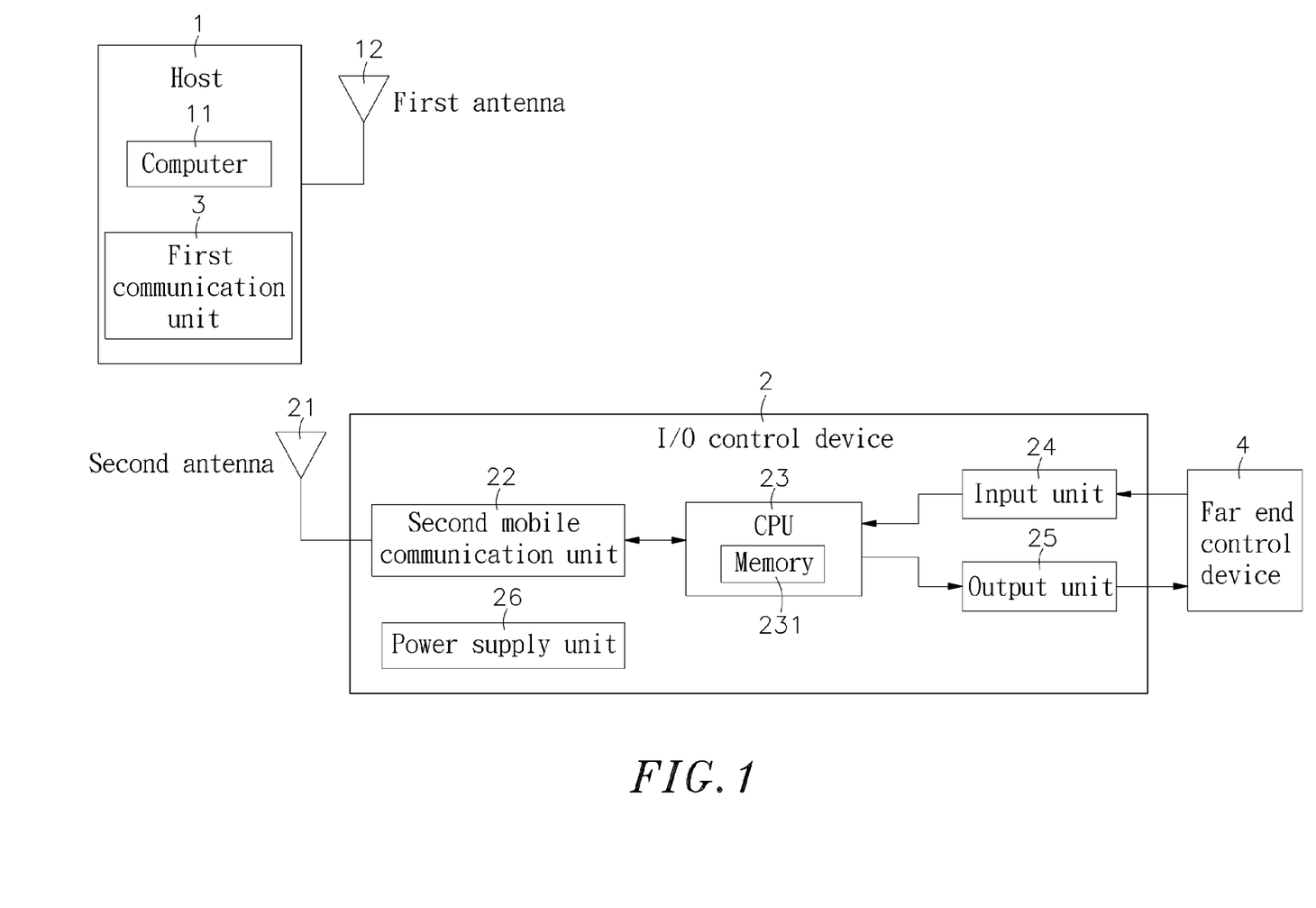
FIG. 1 is a block diagram of a far-end control method with a security mechanism according to a preferred embodiment of the present invention.

Referring to FIG. 1, the present invention comprises a host 1, an I/O control device 2, a first communication unit 3 and a far-end control device 4.

The host 1 comprises of a computer 11 and a first antenna 12 enabling the host 1 to connect to the internet through the computer 11. The internet of the computer 11 has a static IP address and can be connected via wired or wireless connection. The first antenna 12 is used for wireless connection. The computer 11 can be a notebook computer, an industrial computer, a desktop computer or a server.

The I/O control device 2 is connected to the host 1 through the PSTN (Public switched telephone network) or mobile internet. The I/O control device 2 comprises a second antenna 21 connected to a second mobile communication unit 22. The second mobile communication unit 22 is electrically connected to a CPU 23 having a memory 231. The memory 231 of CPU 23 comprises a predetermined value for matching with the identification code. The CPU 23 respectively connects to an input unit 24 and an output unit 25. The I/O control device 2 further comprises a power supply unit 26 for supplying electricity to the above the second antenna 21, the second communication unit 22, the CPU 23, the input unit 24 and the output unit 25 while electrically connecting thereby. The I/O control device 2 can be one or plural. The formation of the PSTN (Public switched telephone network) and the mobile internet that the second communication unit 22 can receive include global system for mobile communication (GSM), general packet radio service (GPRS), code division multiple access (CDMA), wideband code division multiple access (W-CDMA), high speed download packet access (HS-DPA) and enhanced data rates for GSM evolution (EDGE).

The first communication unit 3 is installed in the host 1, and can transmit an identification code through the PSTN (Public switched telephone network) to the second antenna 21 of the I/O control device 2. The first communication unit 3 can also be installed in the computer 11 of the host 1, for example, a PSTN (Public switched telephone network) interface card or software, or set externally and independently external to the computer 11, for example, a cellular phone or other mobile communication device. The first communication unit 3 can be a wired communication device, for example, a telephone, to transmit the signal through the equipment of the service provider to the second antenna 21 of the I/O control device 2. The identification code can be a telephone number, a text message or a password.

The far-end control device 4 can be connected to the input unit 24 and the output unit 25 of the I/O control device 2, thus enable the far-end control device 4 to mutually transmit information or signals with the I/O control device 2 through the input unit 24 and the output unit 25 in order to execute the related tasks. The connection can be through the RS232 and RS485 of a string transmission or a transmission control protocol/internet protocol (TCP/IP) of the network transmission. The far-end control device 4 can be a gate inhibition device, the open/close device of water gate and the meters copying device (for electricity, water and gas).

Figure 2:
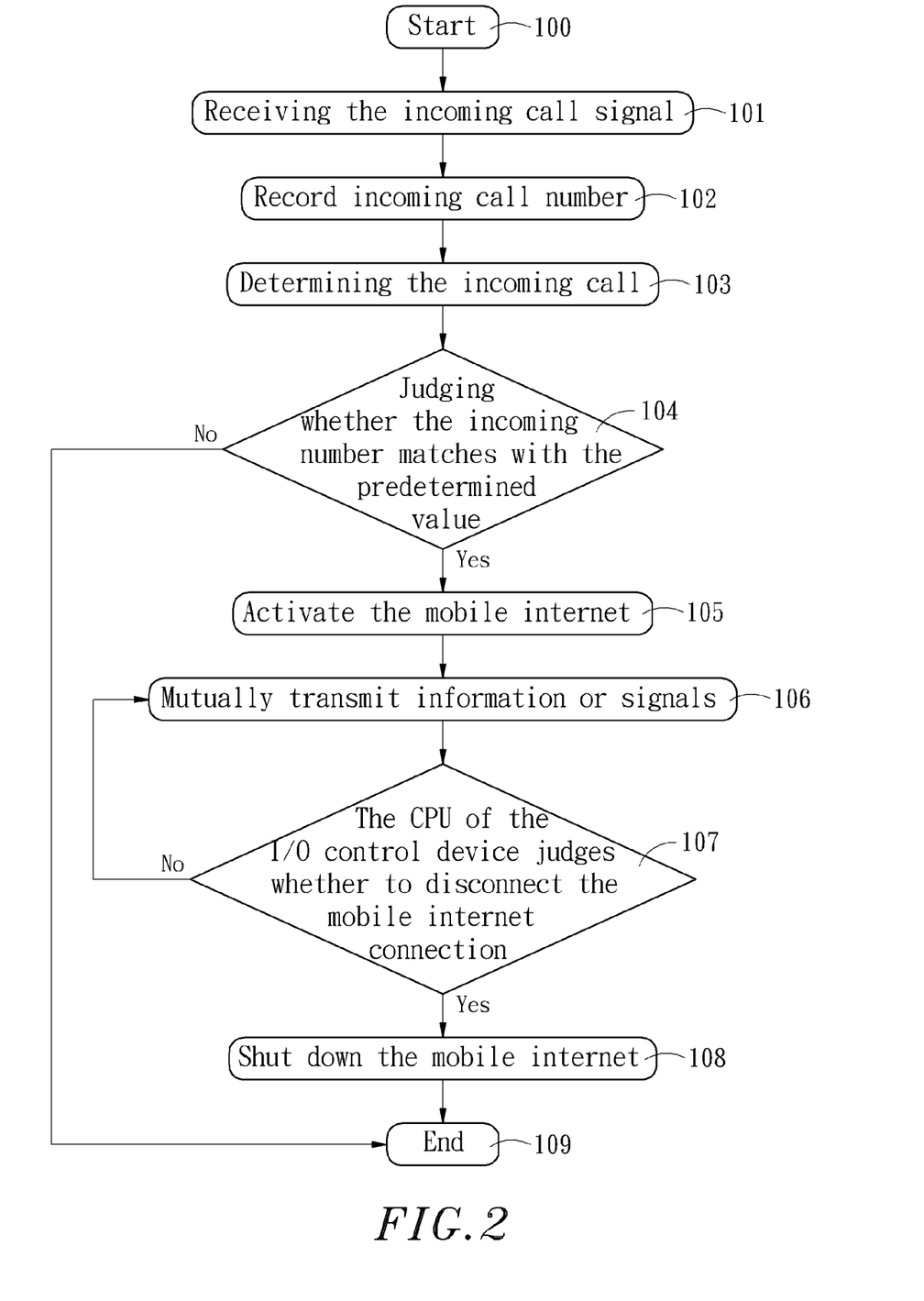
FIG. 2 is a process flow chart illustrating a method of verifying a telephonic signal of a far-end control method with a security mechanism according to an embodiment of the present invention.

Referring to FIGS. 1 and 2, the host 1 and the I/O control device 2 can communicate through the PSTN (Public switched telephone network) and the mobile internet. However, the function of the mobile internet is turned off in a general situation, only the PSTN (Public switched telephone network) is activated, for example, the telephone communication function of the GSM. When the host 1 transmits an identification code through the PSTN (Public switched telephone network) to the I/O control device 2, the predetermined value stored in the I/O control device 2 will be processed for matching for further activating and executing the mobile internet function of the host 1. The identification code can be a telephone number. The procedure for the host 1 to connect to the I/O control device 2 through the PSTN (Public switched telephone network) may be described as follows.

At step 100, process is started.

At step 101, the first communication unit 3 transmits the incoming call signal through the first antenna 12 to the second antenna 21 of the I/O control device 2 from the PSTN (Public switched telephone network), and the second antenna 21 further transmits the signal to the CPU 23 through the second mobile communication unit 22.

At step 102, the CPU 23 records the number of the incoming call in the memory 231.

At step 103, the CPU 23 commands to hang up the phone to the second mobile communication unit 22, and the second mobile communication unit 22 transmits the command to the host 1 through the second antenna 21 to execute hanging up of the phone.

At step 104, the CPU 23 judges whether the number of the call matches with the predetermined value stored in the memory 231, wherein if the call matches with the predetermined value stored in the memory 231, the process proceeds to step 105, otherwise the process proceeds to step 109.

At step 105, the CPU 23 notifies the second mobile communication unit 22 to activate the mobile internet bridged with the computer 11.

At step 106, when the mobile internet connected between the computer 11 and the I/O control device 2 is activated, the far-end control device 4 starts to mutually transmit information or signals with the computer 11 having the static IP address.

At step 107, the CPU 23 of the I/O control device 2 judges whether to disconnect the mobile internet connection between the computer 11 and the far-end control device 4, wherein if it is judged not to disconnect the mobile internet connection between the computer 11 and the far-end control device 4, the process proceeds to step 106, otherwise, the process proceeds to step 108.

At step 108, the CPU 23 of the I/O control device 2 notifies the second mobile communication unit 22 to shut down the mobile internet connected to the computer 11.

At step 109, the process is ended.

Figure 3:
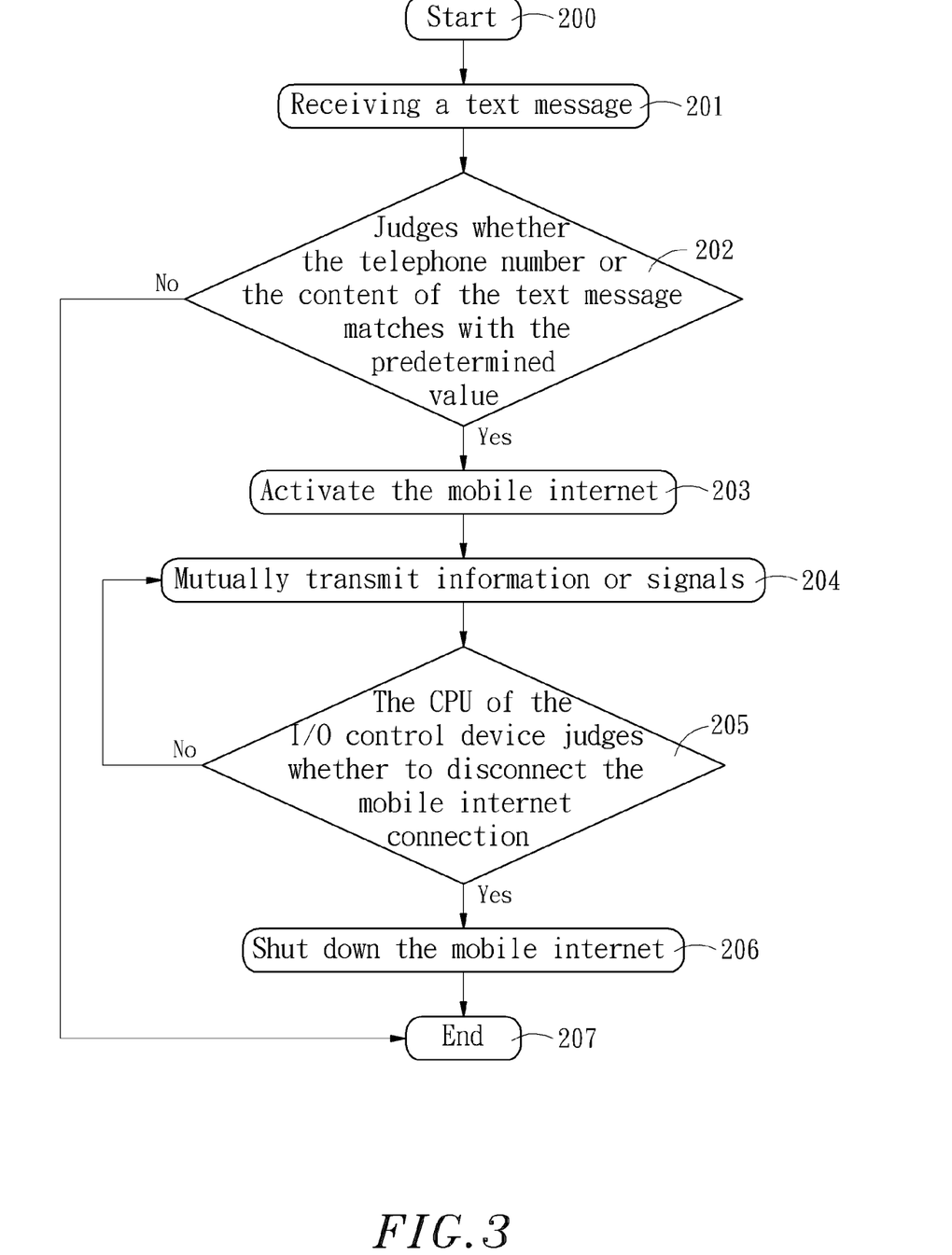
FIG. 3 is a process flow chart illustrating a method of verifying a text message and a number signal of a far-end control method with a security mechanism according to an embodiment of the present invention.

Referring to FIGS. 1 and 3, the identification code can be a text message content or a text message number, the host 1 can transmit the text message through the PSTN (Public switched telephone network) to the I/O control device 2, and the procedure is described as follows.

At step 200, the process is started.

At step 201, the first communication unit 3 transmits a text message through the first antenna 12 to the second antenna 21 of the I/O control device 2 from the PSTN (Public switched telephone network), and the second antenna 21 further transmits the text message to the CPU 23 through the second mobile communication unit 22.

At step 202, the CPU 23 judges whether at least one of text massage content and text massage number matches with the predetermined value stored in the memory 231, wherein if the number of the text message matches with the predetermined value stored in the memory 23, the process proceeds to step 203, otherwise the process proceeds to step 207.

At step 203, the CPU 23 notifies the second mobile communication unit 22 to activate the mobile internet bridged with the computer 11.

At step 204, when the mobile internet connected between the computer 11 and the I/O control device 2 is activated, the far-end control device 4 starts to mutually transmit information or signals with the computer 11 having the static IP address.

At step 205, the CPU 23 of the I/O control device 2 judges whether to disconnect the mobile internet connection between the computer 11 and the far-end control device 4, wherein if it is judged not to disconnect the mobile internet connection between the computer 11 and the far-end control device 4, the process proceeds to step 204, otherwise the process proceeds to step 206.

At step 206, the CPU 23 of the I/O control device 2 notifies the second mobile communication unit 22 to shut down the mobile internet connected with the computer 11.

At step 207, the process is ended.

Figure 4:
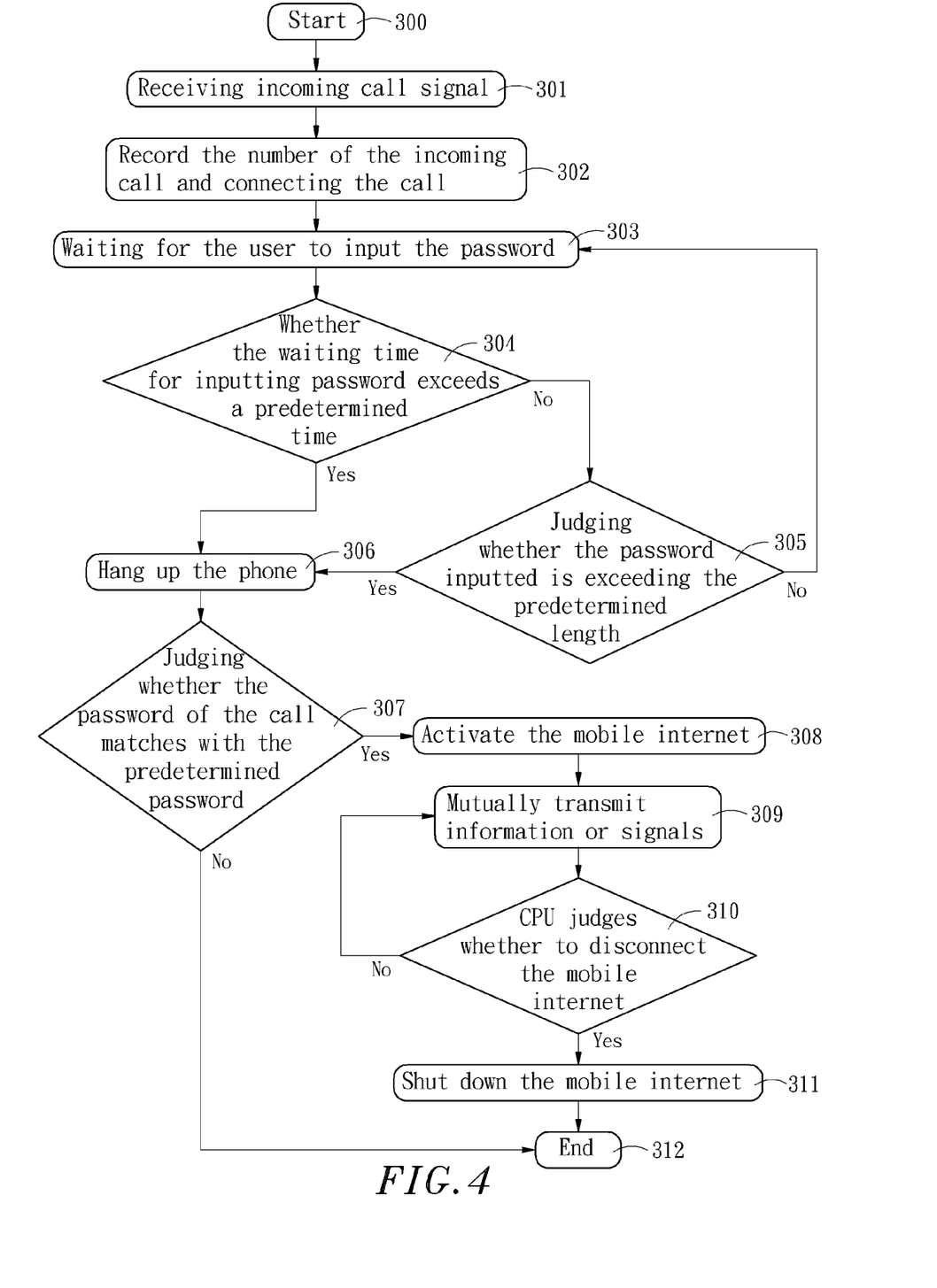
FIG. 4 is a process flow chart illustrating a method of verifying a password and a telephonic signal of a far-end control method with a security mechanism according to an embodiment of the present invention.

In addition, referring to FIGS. 1 and 4, the I/O control device can also comprise a dual protection mechanism. For example, the host 1 can also match the telephone number and the code pre-stored in the I/O control device 2, and the procedure may be described as follows.

At step 300, the process is started.

At step 301, the first communication unit 3 transmits the incoming call signal through the first antenna 12 to the second antenna 21 of the I/O control device 2 from the PSTN (Public switched telephone network), and the second antenna 21 further transmits the signal to the CPU 23 through the second mobile communication unit 22.

At step 302, the CPU 23 records the number of the incoming call in the memory 231, and commands to the second mobile communication unit 22 to receive the call; the second mobile communication unit 22 transmits this command to the first communication unit 3 through the second antenna 21 in order to connect the call coming from the host 1.

At step 303, the host 1 waits for the user to input the password.

At step 304, the CPU 23 judges whether the waiting time for inputting password exceeds a predetermined time in the memory 231, wherein if the waiting time for inputting password does not exceed the predetermined time in the memory 231 the process proceeds to step 305, otherwise the process proceeds to step 306.

At step 305, the CPU 23 judges whether the password inputted from the host 1 is longer than the predetermined length stored in the memory 231, if it is judged that the password inputted from the host 1 is longer than the predetermined length stored in the memory 231, the process proceeds to step 303, otherwise the process proceeds to step 306.

At step 306, the CPU 23 commands to hang up the call to the second mobile communication unit 22, and the second mobile communication unit 22 transmits the command to the host 1 through the second antenna 21 to execute hanging up of the call.

At step 307, the CPU 23 judges whether the number of the call matches with the predetermined value stored in the memory 231, wherein if it is judged that the number of the call matches with the predetermined value stored in the memory 231, the process proceeds to step 308, otherwise the process proceeds to step 312.

At step 308, the CPU 23 notifies the second mobile communication unit 22 to activate the mobile internet bridged with the computer 11.

At step 309, when the mobile internet connected between the computer 11 and the I/O control device 2 is activated, the far-end control device 4 starts to mutually transmit information or signals with the computer 11 having the static IP address.

At step 310, the CPU 23 of the I/O control device 2 judges whether to disconnect the mobile internet connection between the computer 11 and the far-end control device 4, wherein if it is judged not to disconnect the mobile internet connection between the computer 11 and the far-end control device 4, the process proceeds to step 309, otherwise the process proceeds to step 311.

At step 311, the CPU 23 of the I/O control device 2 notifies the second mobile communication unit 22 to shut down the mobile internet connected with the computer 11.

At step 312, the process is ended.

In the procedure of matching the above telephone number and the password, the password input method can be dual tone multi-frequency (DTMF), frequency-shift keying (FSK), or others.

In the above steps 107, 205 and 310, the CPU 23 judges the method of cutting the mobile internet connection between the computer 11 and far-end control device 4, including receiving non information or signal transmitted through the mobile internet from the computer 11 and the far-end control device 4 after a certain time. On the other hand, the I/O control device 2 can also execute disconnection of the mobile internet connection between the computer 11 and the far-end control device 4 upon receiving the line disconnection command from the computer 11 and the far-end control device 4.

Furthermore, the predetermined values of the above three embodiments comprise telephone numbers, text messages or passwords, and these three embodiments can be applied in the meters of the gate inhibition system, water gate monitoring system and meter reading system for electricity, water or gas. Application in the gate inhibition system can effectively prevent band width occupied and information stolen, or even cause gate closing and opening abnormally by the hacker invasion due to the telephone number and the text message have to be verified, even connection to the mobile internet requires inputting the password. Application in the water gate monitoring system can also effectively prevent the hacker invasion to avoid disablement to transmit the water level data or data being unauthorized changed, which may cause malfunction of the gate to further cause property and life loss. In addition, remote reading data of the meters saves the man power by avoiding a person from going to places to obtain the information of the meters. If the information can't be protected by any security mechanism or the band width is occupied, the value of the meters can be retrieved by the far-end or the far-end may even receive the wrong data. But with the above security mechanism, the defects described in above embodiments can be effectively solved. After the information or the signals transmission between these two ends is complete, the I/O control device 2 can disconnect the mobile internet connection from the computer 11, and thereby prevent hacker invasion, reduce the cost for mobile internet connection, as well as save the power consumption of I/O control device 2.

However, the above three embodiments are illustrated for the purpose of merely demonstrating the present invention, and the description thereof is not intended for limiting the scope of the present invention. The primary feature of the present invention includes using the CPU 23 of the I/O control device 2 to read and verify the identification code transmitted through the PSTN (Public switched telephone network) by the first communication unit 3 in order to prevent the invasion of the unauthorized users. The three identification codes comprising the reading to the telephone number, text message and password that are described is not intended to limit the scope of the present invention. The CPU 23 judges the identification code transmitted through the PSTN (Public switched telephone network) by the first communication unit 3, if the identification code matches with the predetermined value stored in the memory 231 of CPU 23, the mobile internet will be activated to connect the computer 11 and the I/O control device 2. This concept is the feature of the present invention, any modification and variations thereof shall be construed to be within the spirit and scope of the present invention.

Furthermore, the main feature of the present invention is to use the CPU 23 of the I/O control device 2 to read and verify the identification code of the host 1, the details of the connection and the transmission between the far-end control device 4 and the input and the output unit 24 and 25 are not the main feature of the present invention, and therefore, the plurality of the methods are not described thereby.

Figure 5:
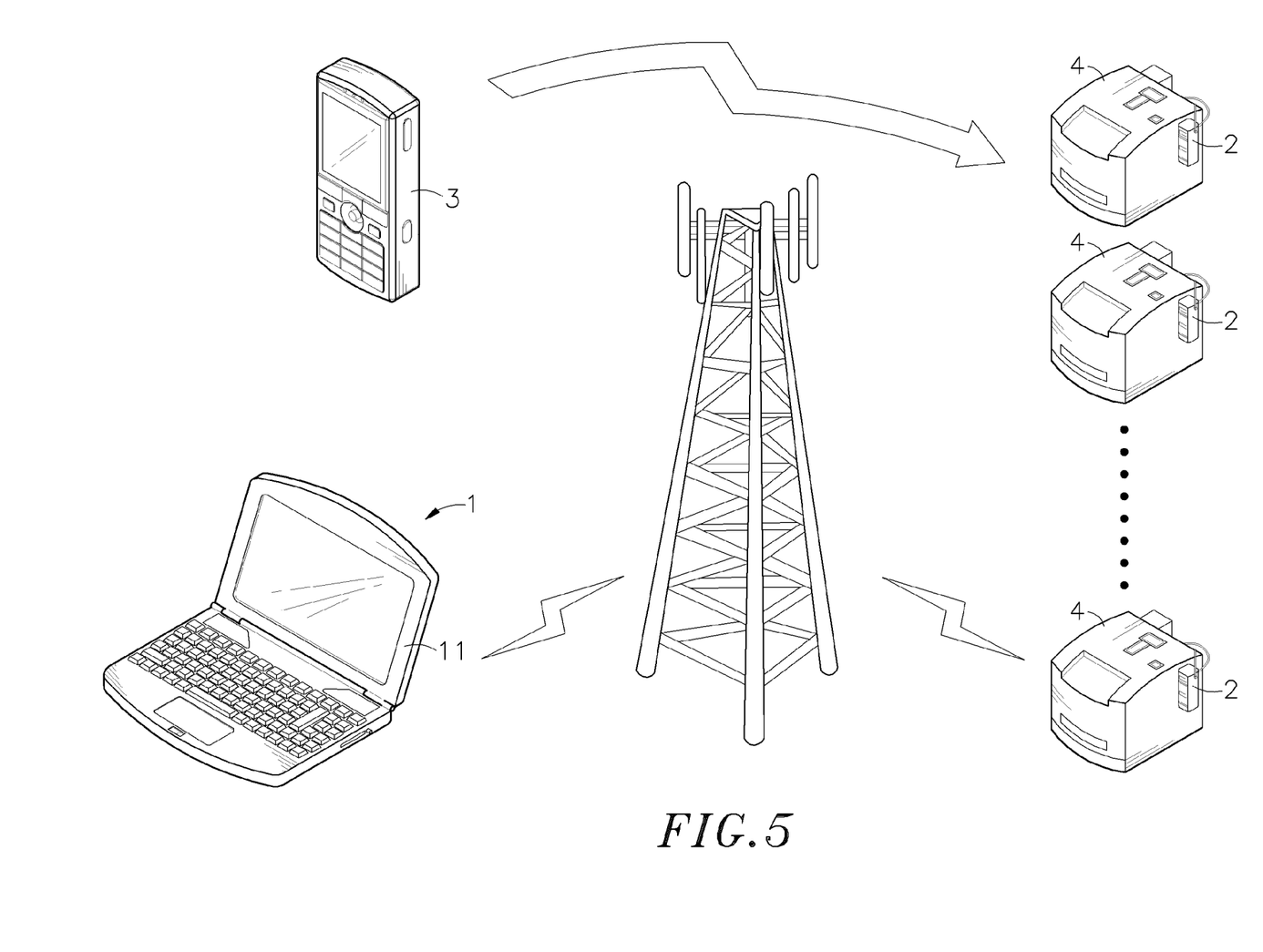
FIG. 5 is an elevational view illustrating a far-end control method with a security mechanism according to a preferred embodiment of the present invention.

Referring to FIGS. 1 and 5, the elevational views show that the host 1 mutually transmits signals with the plurality of I/O control device 2 and the plurality of far-end control device 4 through the PSTN (Public switched telephone network) and the mobile internet.

Figure 6:
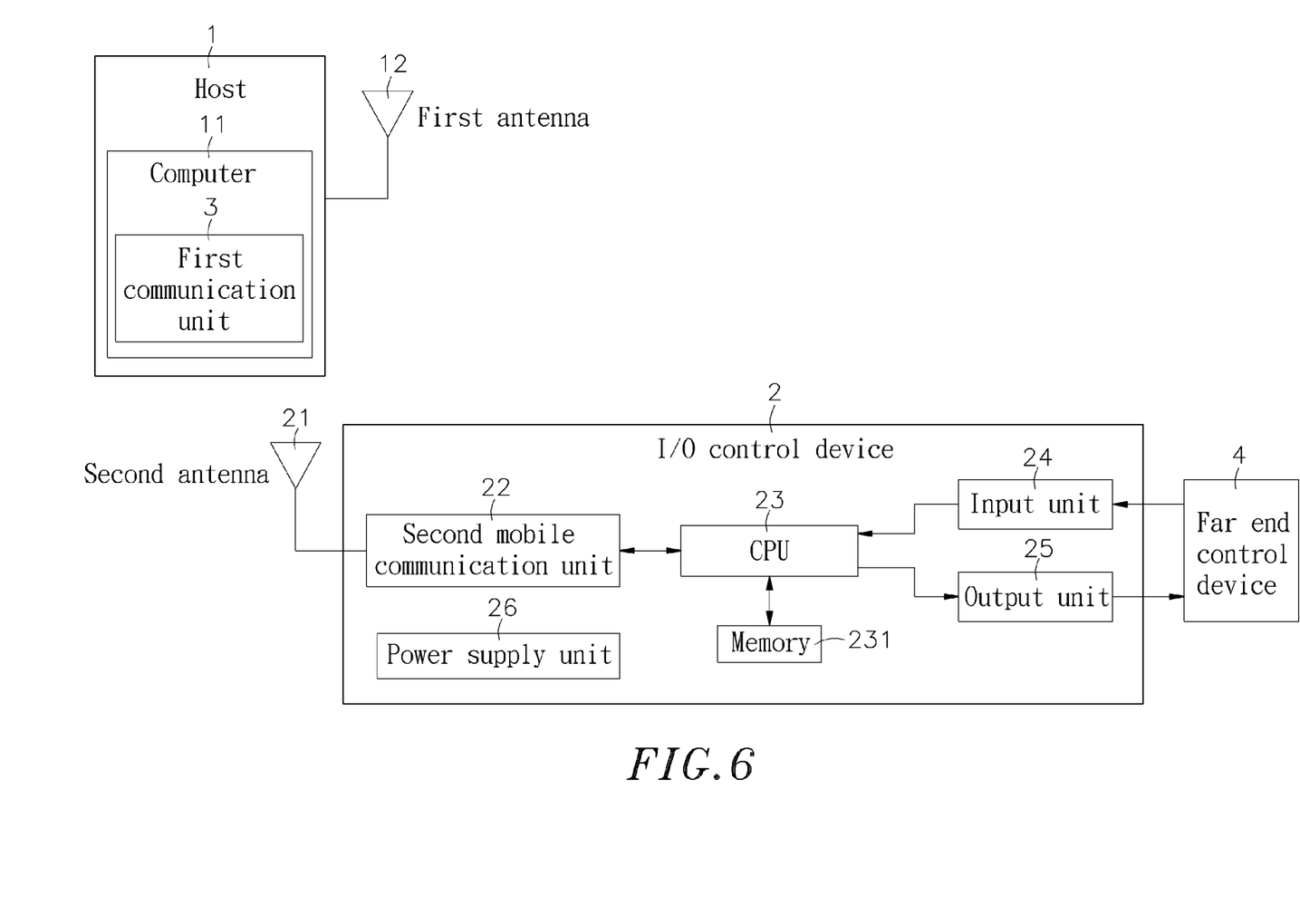
FIG. 6 is a block diagram of a far-end control device with a security mechanism according to another embodiment of the present invention.
Figure 7:
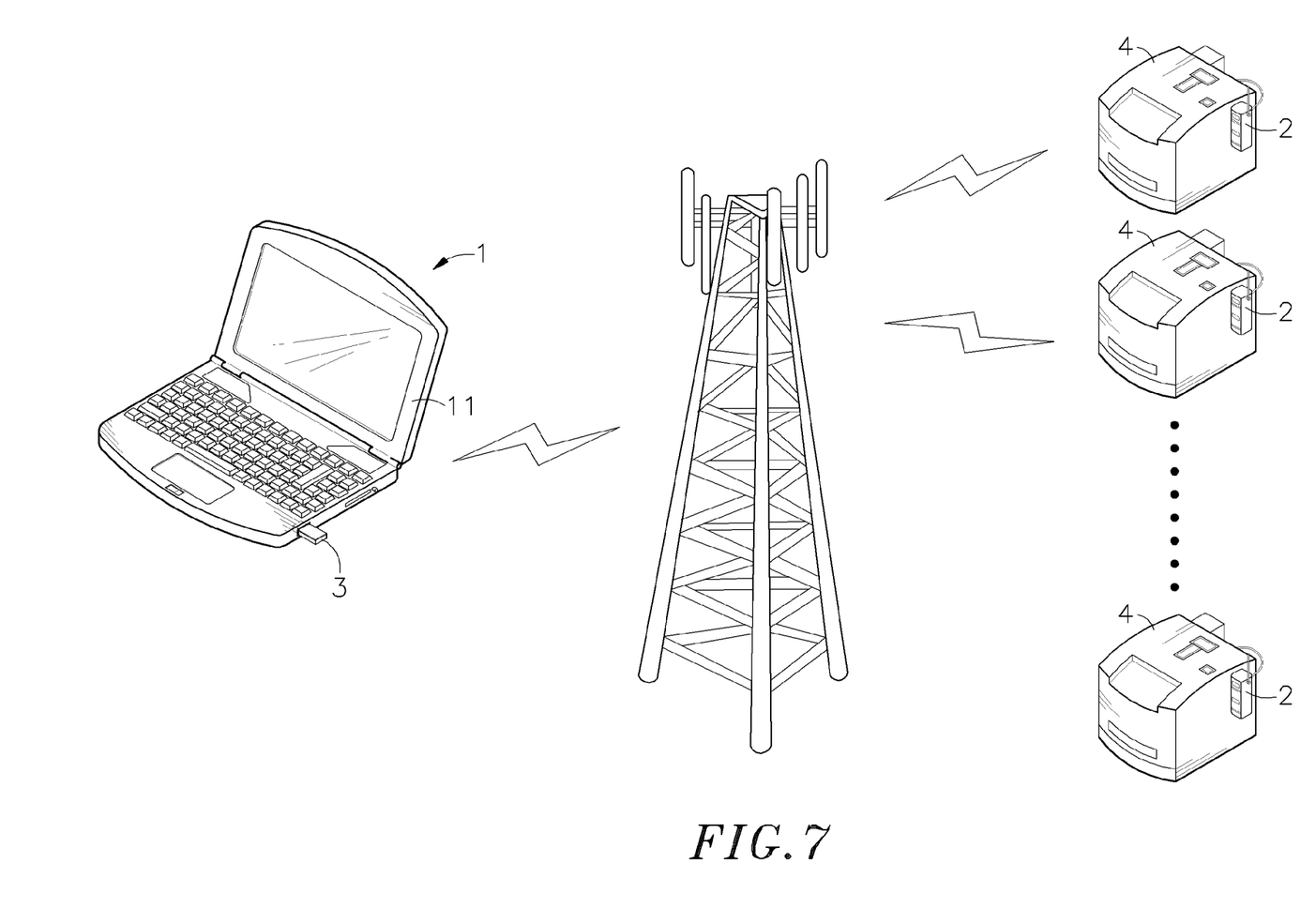
FIG. 7 is an elevational view illustrating a far-end control method with a security mechanism according to another embodiment of the present invention.

Referring to FIGS. 6 and 7, the embodiment indicates that the first communication unit 3 is disposed in the computer 11 of the host 1, the first communication unit 3 can be a telephone network interface card or a software; when the computer 11 connects to an external telephone network interface card or loads the software with the telephone network, the mobile communication can be executed. Furthermore, the memory 231 can be independent from the CPU 23 and a nonvolatile memory, for example, a flash memory, an erasable programmable read only memory (EPROM), or others.

The far-end control method with the security mechanism has the following advantages.

First of all, the present invention is the CPU 23 of the I/O control device 2 to judge whether the identification code transmitted from the host 1 through the PSTN (Public switched telephone network) matches with the predetermined value stored in the memory 231 of the CPU 23; if it is judged that the identification code transmitted from the host 1 through the PSTN (Public switched telephone network) matches with the predetermined value stored in the memory 231 of the CPU 23, the mobile internet connection between the computer 11 of the host 1 and the I/O control device 2 will be activated, and the connection will be terminated when the transmission is completed. Thus the mobile internet connection can be more secured to reduce the chances of the IP address from being locked up and invaded, and thereby prevent the band width from being occupied, information from being changed by the unauthorized users, or the host 1 being disabled from information and signals retrievals or receiving on time from the monitoring device, and accordingly ensuring the security of the property of the company and the safety of the labors.

Second, the computer 11 of the host 1 has a static IP address, the I/O control device 2 activates and proceeds the mobile internet connection with the computer 11, there is no need to fix the IP address of the I/O control device 2 for maintaining the connection with the base. Thus, when the computer 11 and the far-end control device 4 mutually transmit signals, the I/O control device 2 disconnects the connection to reduce the connection cost and the power consumption thereof.

Thirdly, the far-end control method with the security mechanism of the present invention does not need the host 1 to call to connect for the verification, the text message does not cost extra charges; if input of password is required, the connection will be determinate right after the password is inputted, thus reduce the communication cost of the PSTN (Public switched telephone network) while executing the security mechanism.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What the invention claimed is:

1. A far-end control method with a security mechanism including a judgment procedure, for use in a system comprising a host and an I/O control device; said host comprising a first antenna, a first communication unit and a computer; said I/O control device comprising a second antenna, a CPU and a second mobile communication unit; said judging procedure comprising:
   (a) starting said judging procedure;
   (b) said first communication unit transmitting an incoming call signal through said first antenna to said second antenna from a PSTN (Public switched telephone network), said second antenna further transmitting said incoming call signal to said CPU through said second mobile communication unit, and said CPU then commanding the host to hang up said incoming call;
   (c) said CPU judging whether a number of said incoming call matches with a predetermined value; wherein if the number of said incoming call matches with the predetermined value, said judging procedure proceeds to step (d), and if the number of said incoming call does not match the predetermined value, said judging procedure proceeds to step (h);

(d) said CPU notifying said second mobile communication unit to activate a mobile internet between said computer and said I/O control device;

(e) when said mobile internet connected between said computer and said I/O control device is activated, a far-end control device mutually transmitting information or signals with said computer via said I/O control device and said mobile internet;

(f) said CPU judging whether to disconnect said mobile internet connection between said computer and said I/O control device; wherein if said CPU judges that said mobile internet connection between said computer and said far-end control device should be disconnected, said judging procedure proceeds to step (g), and if said CPU judges that said mobile internet connection between said computer and said far-end control device should not be disconnected, said judging procedure proceeds to step (e);

(g) said CPU notifying said second mobile communication unit to shut down said mobile internet connected with said computer; and (h) ending said judging procedure;

wherein said I/O control device comprises an input unit and an output unit, and a connection between said input and output unit and far-end control device is implemented via a R1232 or a RS485 of a string transmission or a transmission control protocol/internet protocol (TCP/IP) of a network transmission; and wherein said far-end control device is one of a gate inhibition device, an open/close device of water gate and a meter reading device for electricity, water and gas.

2. The far-end control method with a security mechanism according to claim 1, wherein said predetermined value is stored in a memory of said CPU, or stored independently in a nonvolatile memory externally connected to said CPU.

3. The far-end control method with a security mechanism according to claim 2, wherein when said CPU receives said number of said incoming call transmitted from said host, said CPU records said number of said incoming call in said memory, and then said CPU commands hanging up of said incoming call to said second mobile communication unit, and said second mobile communication unit transmits said command through said second antenna to said host.

4. The far-end control method with a security mechanism according to claim 1, wherein said CPU judges a method for determining said mobile internet connection between said computer and said far-end control device comprises receiving non information or signal transmitted through said mobile internet from said computer and said far-end control device after a predetermined time, or execute disconnecting said mobile internet connection between said computer and said far-end control device upon said I/O control device receiving a line disconnecting command from said computer or said far-end control device.

5. The far-end control method with a security mechanism according to claim 1, wherein said I/O control device comprise one or plural.

6. The far-end control method with a security mechanism according to claim 1, wherein a receivable formation of said PSTN (Public switched telephone network) and said mobile internet for said second mobile communication unit comprises a global system for mobile communication (GSM), a general packet radio service (GPRS), the code division multiple access (CDMA), a wideband code division multiple access (W-CDMA), a high speed download packet access (HSDPA) and an enhanced data rates for GSM evolution (EDGE).

7. The far-end control method with a security mechanism according to claim 1, wherein said first communication unit comprises a cellular phone or a telephone.

8. The far-end control method with a security mechanism according to claim 1, wherein said first communication unit comprises an interface card or software with a function of PSTN (Public switched telephone network) installed in said computer.

9. A far-end control method with a security mechanism including a judging procedure, for use with a system comprising a host comprising a first antenna, a first communication unit and a computer and an I/O control device comprising a second antenna, a CPU and a second mobile communication unit; said judging procedure comprising:

(a) starting said judging procedure;

(b) said first communication unit transmitting an incoming call signal through said first antenna to said second antenna from a PSTN (Public switched telephone network), and said second antenna further transmitting said incoming call signal to said CPU through said second mobile communication unit;

(c) said CPU recording a number of said incoming call in said memory, and commanding said second mobile communication unit to receive said incoming call; said second mobile communication unit transmitting said command to said first communication unit through said second antenna from the PSTN in order to connect said incoming call coming from said host; (d) said host waiting for a user to input a password;

(e) said CPU judging whether a time waiting for inputting a password exceeds a preset time in said memory; wherein if the CPU judges that said waiting time for inputting said password does not exceed a preset time, said procedure proceeds to step (f), and if the CPU judges that said waiting time for inputting said password exceeds said preset time, said procedure proceeds to step (g);

(f) said CPU judging whether a password inputted from said host is longer than a predetermined length; wherein if said CPU judges that said password inputted from said host is longer than said predetermined length, said judging procedure proceeds to step (d), and if said CPU judges that said password inputted from said host is not longer than said predetermined length, said judging procedure proceeds to step (g);

(g) said CPU commanding hanging up of said incoming call to said second mobile communication unit, and said second mobile communication unit transmitting said command to said host through said second antenna from the PSTN to execute hanging up of said incoming call;

(h) said CPU judging whether said password matches with a predetermined value stored in said I/O control device; wherein if said CPU judges that said password matches with said predetermined value, said judging procedure proceeds to step (i), and if it is not judged that said password matches with the predetermined value, said judging procedure proceeds to step (m);

(i) said CPU notifying said second mobile communication unit to activate a mobile internet between said computer and said I/O control device;

(j) when said mobile internet connected between said computer and said I/O control device is activated, a far-end control device starting to mutually transmit information or signals with said computer via said I/O control device and said mobile internet;

(k) said CPU judging whether to disconnect said mobile internet connection between said computer and said I/O control device; wherein if said CPU judges that said mobile internet connection between said computer and said I/O control device should be disconnected, said judging procedure proceeds to step ( ), and if said CPU judges that mobile internet connection between said computer and said I/O control device should not be disconnected, said judging procedure proceeds to step (j); (l) said CPU notifying said second mobile communication unit to shut down said mobile internet connected with said computer; (m) ending said judging procedure;

wherein said I/O control device comprises an input unit and an output unit, and a connection between said input and output unit and far-end control device is implemented via a RS232 or a RS485 of a string transmission or a transmission control protocol/internet protocol (TCP/IP) of a network transmission; and wherein said far-end control device is one of a gate inhibition device, an open/close device of water gate and a meter reading device for electricity, water and gas.

10. The far-end control method with a security mechanism according to claim 9, wherein said incoming telephone number, said predetermined password, predetermined time of waiting for inputting password and a predetermined length of password are stored in said memory of said CPU, or stored independently in a nonvolatile memory externally connected to said CPU.

11. The far-end control method with a security mechanism according to claim 9, wherein said CPU judges a method for determining said mobile internet connection between said computer and said far-end control device comprising receiving non information or signal transmitted through said mobile internet from said computer and said far-end control device after a predetermined time, or execute disconnecting said mobile internet connection between said computer and said far-end control device when said I/O control device receiving a line disconnecting command from said computer or said far-end control device.

* * * * *